(No Model.)
J. H. BENNETT.
KNIFE HANDLE.
No. 485,166.  Patented Nov. 1, 1892.
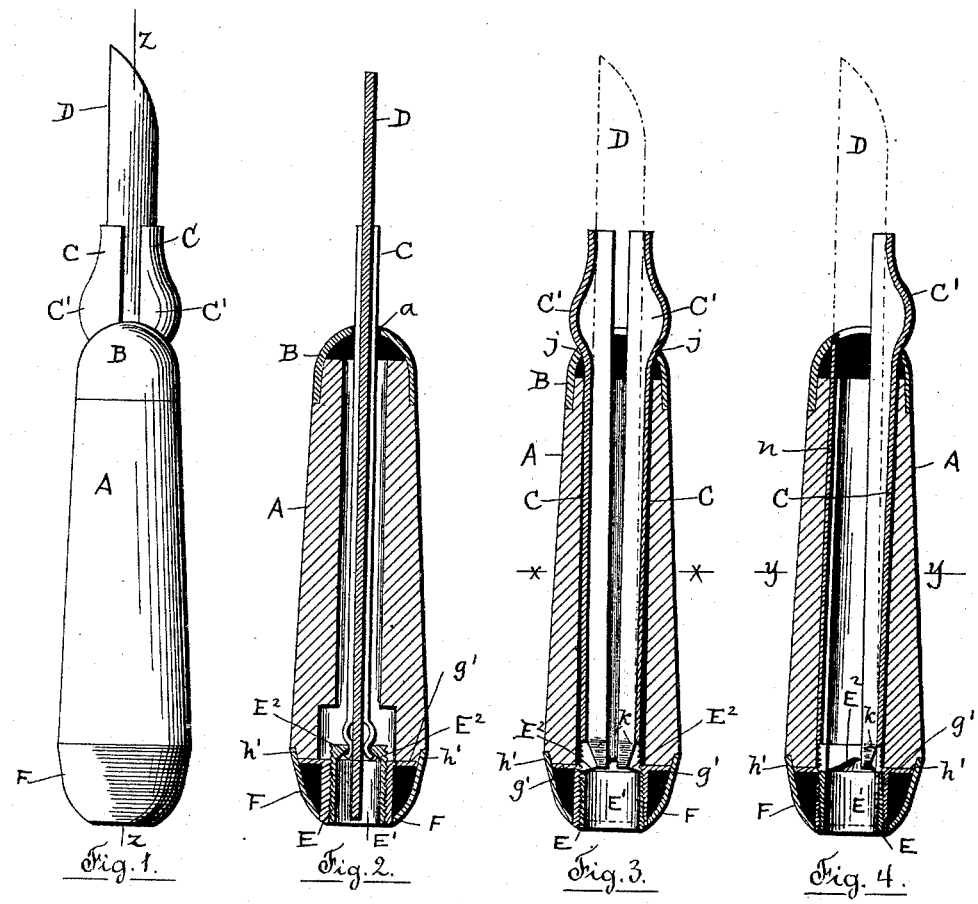
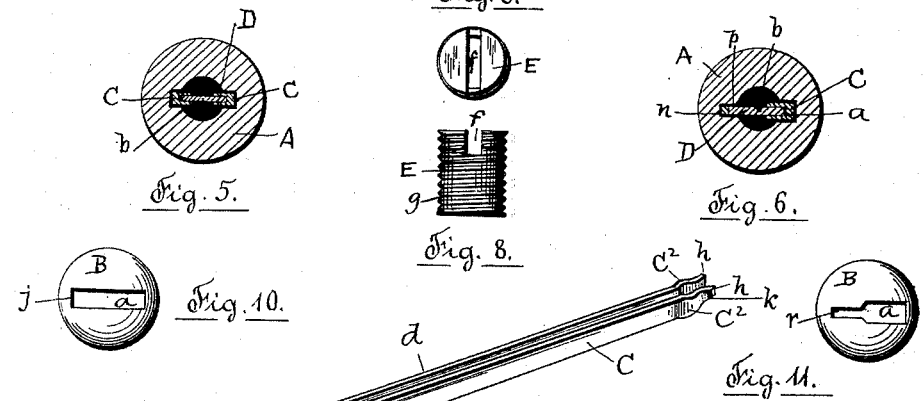
Witnesses
Chas. F. Schmelz.
H. W. Fowler
Inventor
John H. Bennett,
By his Attorney
Rufus B. Fowler

United States Patent Office.

JOHN H. BENNETT, OF WORCESTER, MASSACHUSETTS.

KNIFE-HANDLE.

SPECIFICATION forming part of Letters Patent No. 485,166, dated November 1, 1892.

Application filed July 5, 1888. Serial No. 279,151. (No model.)

*To all whom it may concern:*

Be it known that I, JOHN H. BENNETT, a citizen of the United States, and a resident of Worcester, in the county of Worcester and the State of Massachusetts, have invented a new and useful Improvement in Knife-Handles, of which the following is a full, clear, and exact description, accompanied by drawings which, together with the following description, form a specification of my invention.

Figure 1 is a view of a knife whose handle embodies my invention. Fig. 2 is a central sectional view on line Z Z, Fig. 1. Fig. 3 is a central sectional view on a plane at right angles to that shown in Fig. 2. Fig. 4 is a central sectional view upon the same plane as that shown in Fig. 3 and illustrating a modified form of handle. Fig. 5 is a cross-sectional view on line X X, Fig. 3. Fig. 6 is a cross-sectional view on line Y Y, Fig. 4. Fig. 7 is a perspective view of one of the blade-inclosing jaws. Fig. 8 is a view of the hollow screw by which the jaws are tightened upon the blade. Fig. 9 is an end view of the same. Fig. 10 is an end view of the ferrule B, employed in the form of handle shown in Figs. 1 and 2; and Fig. 11 is an end view of the ferrule used upon the modified form of handle illustrated in Fig. 4.

Similar letters refer to similar parts of the several views.

My invention relates to a knife-handle provided with jaws for holding the blade; and it has for its object to provide means for compressing the jaws upon the blade at both ends of the jaws, and also to allow a longer blade to be used.

A denotes a shell forming the body of the handle, and preferably made of wood.

B is a sheet-metal ferrule, having a slot $a$, Fig. 10, through which the jaws and blade pass.

The shell A has a cylindrical hole $b$ running through its entire length, and upon opposite sides of the hole $b$ are slots $c\ c$ to receive the jaws C C, which are formed of a sheet-metal trough having a groove $d$, Fig. 7, in which the edge of the blade D is placed. The lower end of the handle is recessed at $e$ to receive the screw E, consisting of a cylindrical shell slotted at its upper end to take the lower ends of the jaws C C, the slot $f$ opening into an interior chamber E', whose upper or end wall is conical or tapering, as shown in sectional views in Figs. 2, 3, and 4, and by the broken lines $g$ in Fig. 8. The jaws are enlarged at C' C', so that the combined width of the jaws and the blade between the jaws shall exceed the length of the slot $a$ in the ferrule B. The sides of the jaws are also pressed outward at $C^2\ C^2$ to prevent the jaws from entering too far into the slot of the screw E, and the ends of the jaws are turned outward, as shown at $h\ h$, Figs. 2 and 7. The tips $h\ h$ are inserted in the slot $f$, and the tips are then turned outwardly, attaching the jaws to the screw E.

F denotes a nut, in the present instance made of sheet metal and provided with an interior screw-thread to fit the exterior screw-thread upon the screw E. The nut F has also a seat $g'$, which rests against the end of the shell A, and a flange $h'$, which holds the nut concentric with the shell A, and as the nut F is turned upon the screw E the screw and connected jaws are drawn into the shell, and the enlarged portions C' C' are drawn against the end walls $j\ j$ of the slot $a$, causing the jaws to be compressed against the edges of the blade D. As the jaws are drawn into the shell A the inner ends of the jaws are crowded together by means of the pressure of the conical end wall $E^2$ upon the oblique edges $k\ k$ of the bent tips $h\ h$, thereby pressing the inner ends of the jaws against the edges of the blade D and causing the blade D to be held throughout the entire length of the jaws. The screw E is made with an opening throughout its entire length, allowing the blade to be inserted within the screw and permitting a longer blade to be used. The blade is a flat steel blade of uniform width, except at the point, and the projecting end $m$ is ground to a sharp edge, and as the end of the blade is used up the jaws are loosened and the blade drawn out of the shell A and jaws C C.

In Fig. 4 one of the jaws is removed and the edge of the blade is allowed to rest directly against a metallic strip $n$, inserted in the shell A, and the slot in the shell in which the edge of the blade is placed and also the corresponding part of the slot in the ferrule are made narrow, so as to support the sides of the blade D. This form of construction is shown in Fig. 6, in which the narrow slot in the shell is shown at $p$, and in Fig. 11 the narrow portion of the slot in the ferrule is shown at $r$.

I am aware that knife-handles have been in use having a pair of jaws inclosing a blade, said jaws being tightened upon the edges of the blade by means of a screw and nut. Such I do not herein claim, the essential features of novelty in my present invention consisting in making the tightening-screw with an opening through its length to receive the end of the blade and grasping the edges of the blade throughout the entire length of the jaws.

What I claim as my invention, and desire to secure by Letters Patent, is—

1. In a knife-handle, the combination, with a pair of grooved jaws for holding a blade, of a screw connected with said jaws and an actuating-nut on said screw, by which the screw and connected jaws are given a longitudinal movement in the handle, said screw having an opening lengthwise the screw to allow the blade to pass through, substantially as described.

2. In a knife-handle, the combination, with a knife and a shell forming the body of the handle, of a pair of jaws having inclined sides by which the jaws are pressed against the edges of the blade, a screw having an interior chamber, and a slot opening into said chamber, the end wall of said interior chamber being conical, and said jaws and said screw being connected by means of the ends of said jaws entering the inner chamber in said screw and being expanded so as to rest against the conical end wall of said inner chamber, whereby the inner ends of said jaws are carried toward each other as they are moved lengthwise the handle, and an actuating-nut on said screw and acting against the end of the shell, substantially as described.

3. In a knife-handle, the combination, with a knife, of a pair of jaws having the bent tips $h$ $h$ and shoulders $C^2$ $C^2$, a screw slotted to receive the tips $h$ $h$, and an actuating-nut by which said screw and connected jaws are drawn lengthwise the handle, and a shell A, forming the handle, substantially as described.

JOHN H. BENNETT.

Witnesses:
CONRAD R. BENNETT,
RUFUS BENNETT FOWLER.